United States Patent
Hardjono et al.

(10) Patent No.: US 6,725,276 B1
(45) Date of Patent: Apr. 20, 2004

(54) APPARATUS AND METHOD FOR AUTHENTICATING MESSAGES TRANSMITTED ACROSS DIFFERENT MULTICAST DOMAINS

(75) Inventors: Thomas Hardjono, Arlington, MA (US); Bradley Cain, Cambridge, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/290,753

(22) Filed: Apr. 13, 1999

(51) Int. Cl.$^7$ .......................... G06F 15/173; H04L 9/00
(52) U.S. Cl. ..................... 709/238; 713/153; 713/170
(58) Field of Search ................................ 713/153, 168, 713/170, 176; 709/204, 205, 246, 229, 238–242; 370/390

(56) References Cited

U.S. PATENT DOCUMENTS

| | | | | |
|---|---|---|---|---|
| 5,455,865 A | * | 10/1995 | Perlman | ..................... 713/153 |
| 5,748,736 A | * | 5/1998 | Mittra | ......................... 713/163 |
| 5,917,820 A | * | 6/1999 | Rekhter | ...................... 370/392 |
| 6,092,191 A | * | 7/2000 | Shimbo et al. | .............. 713/153 |
| 6,389,532 B1 | * | 5/2002 | Gupta et al. | ................. 713/163 |

FOREIGN PATENT DOCUMENTS

| | | | |
|---|---|---|---|
| EP | 0 598 969 A1 | * | 6/1994 |
| EP | 0 841 831 A2 | | 5/1998 |

OTHER PUBLICATIONS

Oehler, M., et al., HMAC–MD5 IP Authentication with Replay Prevention, RFC–2085, IETF, pp. 1–6, Feb. 1997.*

Thaler, D., et al., Border Gateway Multicast Protocol (BGMP): Protocol Specification, Internet Draft, draft–ietf–idmr–gum–03.txt, pp. 1–41, Aug. 5, 1998.*

Hardjono et al., A Framework for Group Key management for Multicast Security, Internet Draft, draft–ietf–ipsec–gkmframework–00.txt, IETF, pp. 1–21, Jul. 1998.*

Hughes, Larry, "Gateway Designs for Internetwork Multicast Communication", Computer Communications, vol. 12, no 3, Jun. 1989, London GB.

"Multicast Source Discovery Protocol (MSDP)," Network working Group Internet Draft, Farinacci et al., Feb. 2000, pp. 1–33.

"Authenticating PIM Version 2 Messages," Liming, W., Cisco Systems, Network Working Group, Internet Draft, Nov. 11, 1998, pp. 1–6.

* cited by examiner

*Primary Examiner*—Andrew Caldwell
(74) *Attorney, Agent, or Firm*—Steubing McGuinness & Manaras LLP

(57) ABSTRACT

A border network device for transmitting messages between a first multicast domain and a second multicast domain includes a first interface that receives a first domain message from the first domain for delivery to the second domain, a first message converter that converts the received first domain message into a first intermediate message, and an output that forwards the first intermediate message to a receiving second network device in the second domain. The first multicast domain and second multicast domain each respectively have first network devices and second network devices. In preferred embodiments, the first domain message has first domain origin data. Messages with first domain origin data originate from at least one of the first network devices. In a similar manner, the intermediate message includes intermediate data indicating that the intermediate message originated from the border network device.

54 Claims, 7 Drawing Sheets

APPARATUS AND METHOD FOR AUTHENTICATING MESSAGES TRANSMITTED ACROSS DIFFERENT MULTICAST DOMAINS

FIELD OF THE INVENTION

The invention generally relates networks and, more particularly, the invention relates to message transmissions across multicast domains in a computer network.

BACKGROUND OF THE INVENTION

Multicasting is a well known method of transmitting messages to selected groups of users across a network, such as the Internet. One simple example of multicasting entails transmitting an E-mail message to a plurality of users that each are on a mailing list. Video conferencing and teleconferencing also use multicasting principles and thus, often are referred to as "multiconferencing."

Messages transmitted during a multicast often include multicast control parameters that control the execution of the multicast ("control messages"). One exemplary type of control message enables nodes to end an ongoing multicast. Problems arise when an unauthorized network device transmits a control message to a multicast session. For example, an unauthorized network device undesirably may transmits a control message that prematurely ends a multicast session. One solution to this problem (recently proposed by the PIM Working Group of the Internet Engineering Task Force) utilizes well known key encryption techniques to authenticate control messages transmitted between routers within a single multicast domain. To that end, a symmetrical authentication key is provided to each router in the multicast to encrypt and decrypt control messages transmitted in the multicast. Accordingly, upon receipt of a control message from another router, a receiving router can confirm that the control message was transmitted from an authorized router in the multicast by decrypting the received control message with the authentication key.

As is known in the art, a group of network devices (e.g., routers) in a multicast that are administered as a unit with common rules and procedures (e.g., each router utilizing a common authentication key) are considered to be a single multicast domain. Problems therefore arise when members of one multicast domain attempt to communicate with members of another multicast domain. Specifically, network devices in a first multicast domain do not have the second multicast domain authentication key for authenticating messages received from second domain devices. Consequently, multicast messages transmitted from the second multicast domain to the first multicast domain are considered (by receiving devices in the first domain) to originate from devices not authorized to participate in the first domain multicast and thus, are dropped.

SUMMARY OF THE INVENTION

In accordance with one aspect of the invention, a border network device for transmitting messages between a first multicast domain and a second multicast domain includes a first interface that receives a first domain message from the first domain for delivery to the second domain, a first message converter that converts the received first domain message into a first intermediate message, and an output that forwards the first intermediate message to a receiving second network device in the second domain. The first multicast domain and second multicast domain each respectively have first network devices and second network devices. In preferred embodiments, the first domain message has first domain origin data. Messages with first domain origin data originate from at least one of the first network devices. In a similar manner, the intermediate message includes intermediate data indicating that the intermediate message originated from the border network device. A similar method also may be utilized to effectuate this aspect of the invention.

In preferred embodiments, the first intermediate message includes data that causes the receiving second network device to convert the first intermediate message into a second message. The second message includes data indicating that the second message originated from the receiving second network device. In other embodiments, the border network device further includes an intermediate interface that receives a second intermediate message from a given second network device, and a second message converter that converts the received second intermediate message into a converted first domain message with first domain data. The second intermediate message has origination data indicating that it originated from the given second network device. The output may forward the converted first domain message to at least one of the first network devices.

In other embodiments, the first multicast domain has an associated key for authenticating messages transmitted between first network devices. Accordingly, the first origin data may be associated with the first key. The first multicast domain may require that each message authorized to be forwarded to first network devises in a multicast include first domain origin data. In some embodiments, the border network device is one of the first network devices. The border network device also may include memory for storing an intermediate key. The first message converter may retrieve the intermediate key from memory to convert the received first domain message into the first intermediate message. The border network device also may include an authenticator operatively coupled with the first message converter. The authenticator may confirm that the first domain message includes the first domain origin data. In other embodiments, the receiving second network device is a border network device that converts the first intermediate message into a second domain message having data indicating that the message originated from one of the second network devices.

In accordance with another aspect of the invention, a border network device for transmitting messages between a first multicast domain and a second multicast domain includes an intermediate interface that receives a second intermediate message from the second domain, a first message converter that converts the received second intermediate message into a converted first domain message with first domain data, and a first output that forwards the converted first domain message to at least one of the first network devices. The received second intermediate message includes intermediate data indicating that the second intermediate message originated from at least one of the second network devices. In a manner similar to other embodiments, messages with first domain data originate from one of the first network devices. A similar method also may be utilized to effectuate this aspect of the invention.

In other embodiments, the border network device further includes a first interface that receives a first domain message (with first domain data) from at least one of the first network devices, a second message converter that converts the received first domain message into a first intermediate message, and a second output that forwards the first intermediate message to at least one of the second network devices. The first intermediate message has data indicating that it originated from the border router. In another embodiment, the first multicast domain has an associated first key for authenticating messages transmitted between first network devices, where the first domain data is associated with the first key. The first multicast domain may require that each first domain message authorized to participate in the multicast in the first domain include first domain origin data. The border network device also may include an authenticator operatively coupled with the first message converter. The authenticator may check the second intermediate message to determine if the intermediate message includes the second intermediate data.

In accordance with other aspects of the invention, an apparatus and method of transmitting messages between a first multicast domain and a second multicast receives a first message with first identification data from a first network device in the first domain, controls a confirming network device to analyze the first identification data to determine that the first message originated from the first network device, adds second identification data to the first message to form an authenticated message, and forwards the authenticated message to a second network device in the second domain. The first identification data indicates that the first message originated from the first network device. The second identification data indicates that the first message was authenticated by the confirming network device.

In a preferred embodiment, the first identification data includes a digital signature of the first network device, while the second identification data includes a digital signature of the confirming network device. Once authenticated, the first identification data may be removed from the first method.

In accordance with yet another aspect of the invention, an apparatus and method of transmitting messages between a first network device in a first multicast domain, and a second network device in a second multicast domain adds first identification data to a first message to form a preliminary message. The first identification data indicates that the first message originated from the first network device. The preliminary message then is forwarded to a confirming network device in the first multicast domain. The confirming network device then is controlled to determine if the preliminary message includes the first identification data. If determined to include the first identification data, the confirming network device then adds second identification data to the message to form an authenticated message. The second identification data indicates that the first message was authenticated by the confirming network device. The authenticated message then is forwarded to the second network device in the second domain.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF PREFERRED EMBODIMENTS

In accord with preferred embodiments of the invention, a first network device in a first multicast domain cooperates with a second network device in a second multicast domain to a confirm the authenticity of messages transmitted from the first multicast domain to the second multicast domain. The first and second network devices also may cooperate in a similar manner to confirm the authenticity of messages transmitted from the second multicast domain to the first multicast domain. Preferred embodiments cooperate by appending one or more authentication tags to the messages. Network devices in either domain thus examine the authentication tags, if any, to confirm the authenticity of received messages. Details of preferred embodiments are discussed below.

Figure 1:
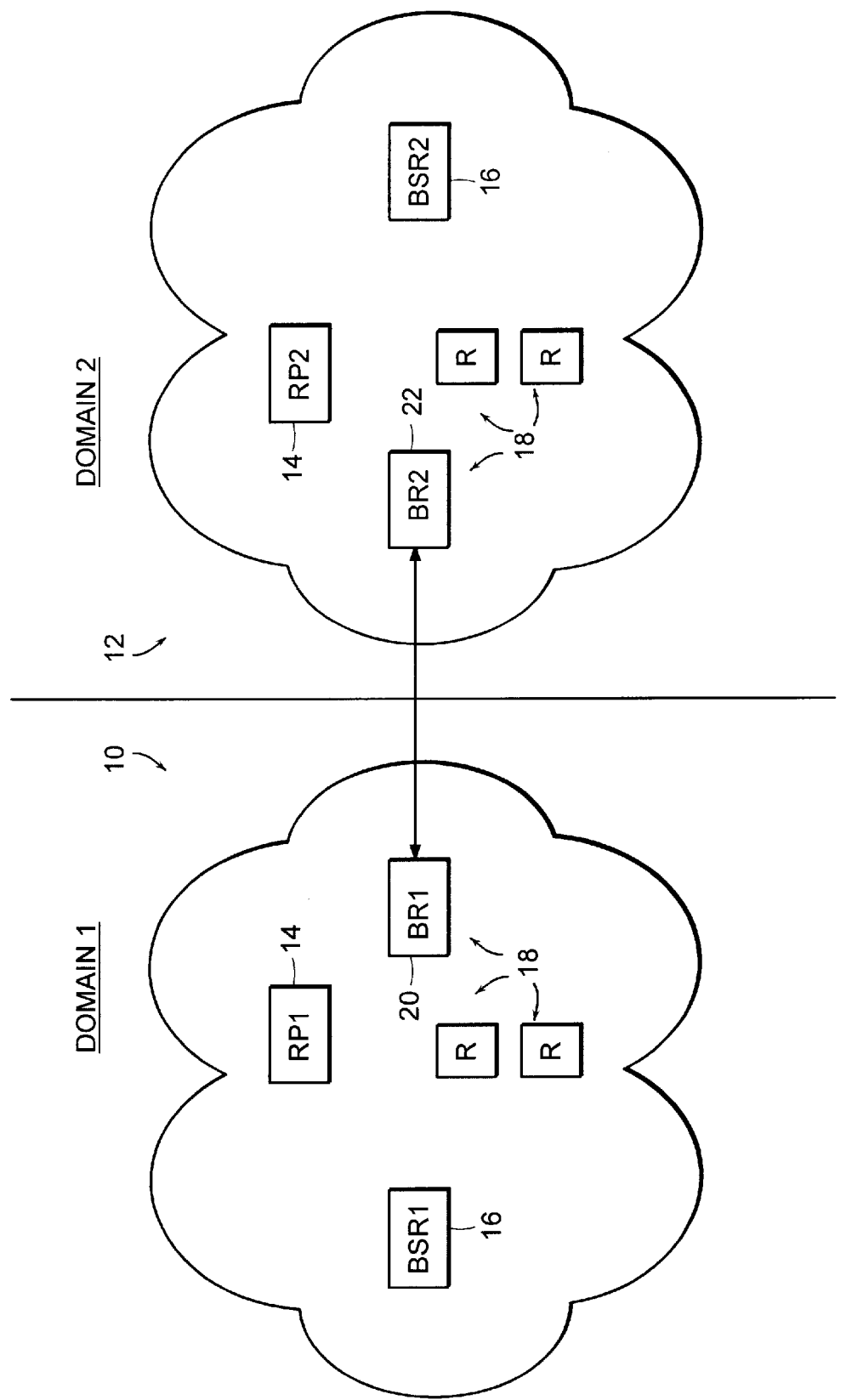
FIG. 1 schematically shows an exemplary network arrangement in which preferred embodiments of the invention may be implemented.

In particular, FIG. 1 schematically shows a preferred network that may be utilized to implement preferred embodiments of the invention. In particular, the network includes a first multicast domain ("first domain 10") and a second multicast domain ("second domain 12") that each operate in accord with any conventional multicast protocol. In preferred embodiments, both. domains operate in accord with the well known Protocol Independent Multicast protocol (also known as the "PIN protocol"). It should be noted, however, that although preferred embodiments are discussed in terms of the PIM protocol, principles of the invention may be applied to other multicast protocols, such as the Internet Protocol multicast protocol ("IP Multicast"). The PIM protocol therefore is discussed for exemplary purposes only and is not intended to limit the scope of preferred embodiments.

Each of the two multicast domains 10 and 12 includes a rendezvous point router 14 for distributing multicast parameters and forming the multicast distribution tree, a bootstrap router 16 for selecting and identifying the rendezvous point router 14, and a plurality of PIM routers 18 that operate in accord with the PIM protocol. The network also may include one or more non-PIM routers (not shown) that merely forward PIM multicast messages toward the PIM routers 18. In addition, the first domain 10 includes a first domain border router ("first border router 20") that cooperates with a second domain border router ("second border router 22") within the second domain 12 to translate arid authenticate inter-domain communication. The first and second border routers 20 and 22 preferably are PIM routers 18 that each are configured to operate as a border router. Although only one border router is shown in each domain, each domain may include additional border routers and still operate in accord with preferred embodiments of the invention. Moreover, the border routers 20 and 22 may communicate in many manners, such as via a direct connection, a larger network (e.g., the Internet), one or more intervening multicast domains, or other known methods. In some embodiments, one border. router is utilized for both domains. It should be noted that all network devices in each domain are interconnected (e.g., via a direct connection or via the Internet) to execute a multicast. Each router 18 preferably is coupled to a local user group (e.g., a local area network) that includes one or more client computer systems.

As noted above, the two domains preferably execute the PIM protocol. Accordingly, routers 18 within each domain communicate via one or more messages that each have an appended tag. More particularly, each time a multicast is either initialized or re-keyed, the rendezvous point router 14 in a given PIM multicast domain transmits a symmetrical authentication key to each router 18 in the given domain. Each router 18 consequently utilizes the key to both authenticate messages received from other routers 18 in the domain, and to generate corresponding authentication tags that are appended to messages within the domain. For example, a message generated from a client computer system (coupled to a router 18) and that domain's key may be utilized as input into a given keyed hash function that is only known by all routers in the multicast domain. The output of the keyed hash function (referred to above and below as a "tag") then may be appended to the message prior to transmitting the message to a second router 18 in the domain. When used with the PIM protocol and similar multicast protocols, the tag is known in the art as a "Message Authentication Code" ("MAC").

Upon receipt of the message, the second router 18 similarly enters the key and message into the same keyed hash function, and then compares the output of such function to the tag appended to the message. If the tag matches the calculated output, then the message is considered to be authenticated. Accordingly, the second router 18 may forward the message to another router 18 in the domain. Conversely, if the tag does not match the calculated output, then the message is considered to be not authenticated. If not authenticated, then the second router 18 may drop the message (i.e., it neither processes the message nor forwards it to another network device).

It should be noted that a message is considered to be "authentic" when received from an authorized network device within a given domain. Receipt of an authentic message from a given router 18 implies that such message originated from the given router 18. A message is deemed to originate from the given router 18 when the given router 18 appends a tag to such message, and then transmits such appended message to another network device. Accordingly, a message may be considered to originate from a given router 18 even when such router's tag has been replaced by another router's tag in another domain. As known in the art and noted above, a PIM router 18 does not append a tag to a message until determined to be authentic.

Figure 2:
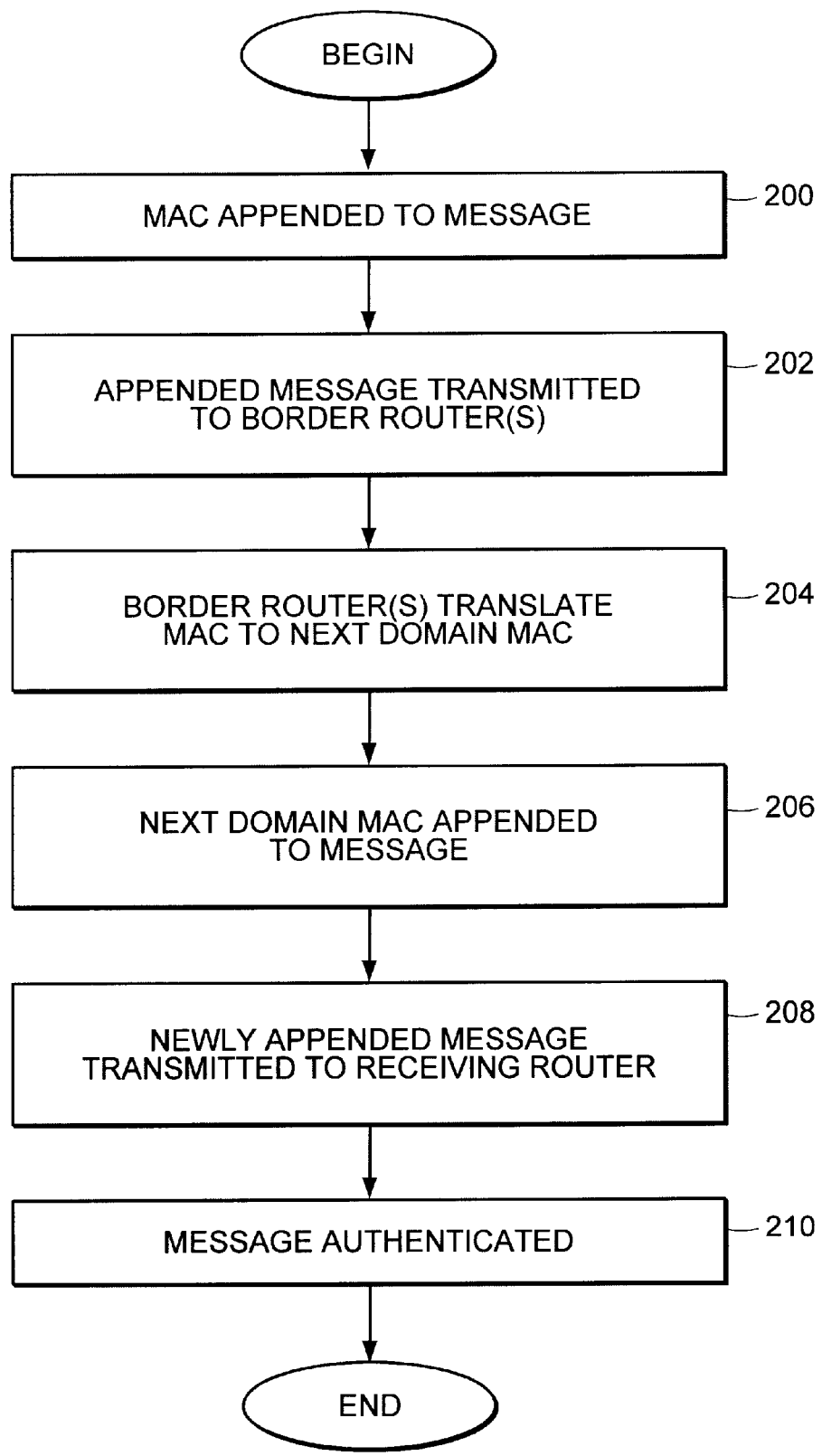
FIG. 2 shows a preferred process of transmitting messages from a first multicast domain to a second multicast domain.

FIG. 2 shows a preferred method of processing messages transmitted between the above noted first and second domains 10 and 12. When describing this and other methods, a message is being transmitted in an inter-domain multicast from a router 18 in the first domain 10 to one or more routers 18 in the second domain 12. Although preferably a control message that controls multicast execution (e.g., a Join or Prune message), the message may be any type of message transmitted from a router 18 in the first domain 10 ("sending router"), to one or more routers 18 in the second domain 12 ("receiving router(s)"). The process begins at step 200 in which the sending router generates and appends a MAC to the message. The appended message then is transmitted to the first border router 20 (step 202). Any intervening routers in the first domain 10 between the sending router and the first border router 20 thus check the MAC, confirm the authenticity of the message, and then transmit the message with appended MAC to the appropriate border router.

The process continues to step 204 in which the first border router 20 cooperates with the second border router 22 to translate the MAC to the appropriate MAC for the second domain 12 (discussed in detail below). Accordingly, the MAC for the second domain 12 is determined and appended to the message (step 206). The MAC for the first domain 10 preferably is removed from the message to save bandwidth. In some embodiments, the second domain MAC is prepended to the message (e.g., in a header), or incorporated into the message itself. Preferred embodiments of the invention are not intended to be limited to the location or method of associating the tag with the message. Additional details of this translation process are discussed with regard to FIG. 3.

Once the second domain MAC is appended to the message, the message and accompanying second MAC are transmitted from the second border router 22 to one or more receiving routers (step 208). The receiving router(s) then authenticate the message in a manner as discussed above (step 210). In particular, each receiving router determines the identity of the tag (e.g., either via a calculation or from a local memory) and compares it to the tag appended to the message.

Figure 3A:
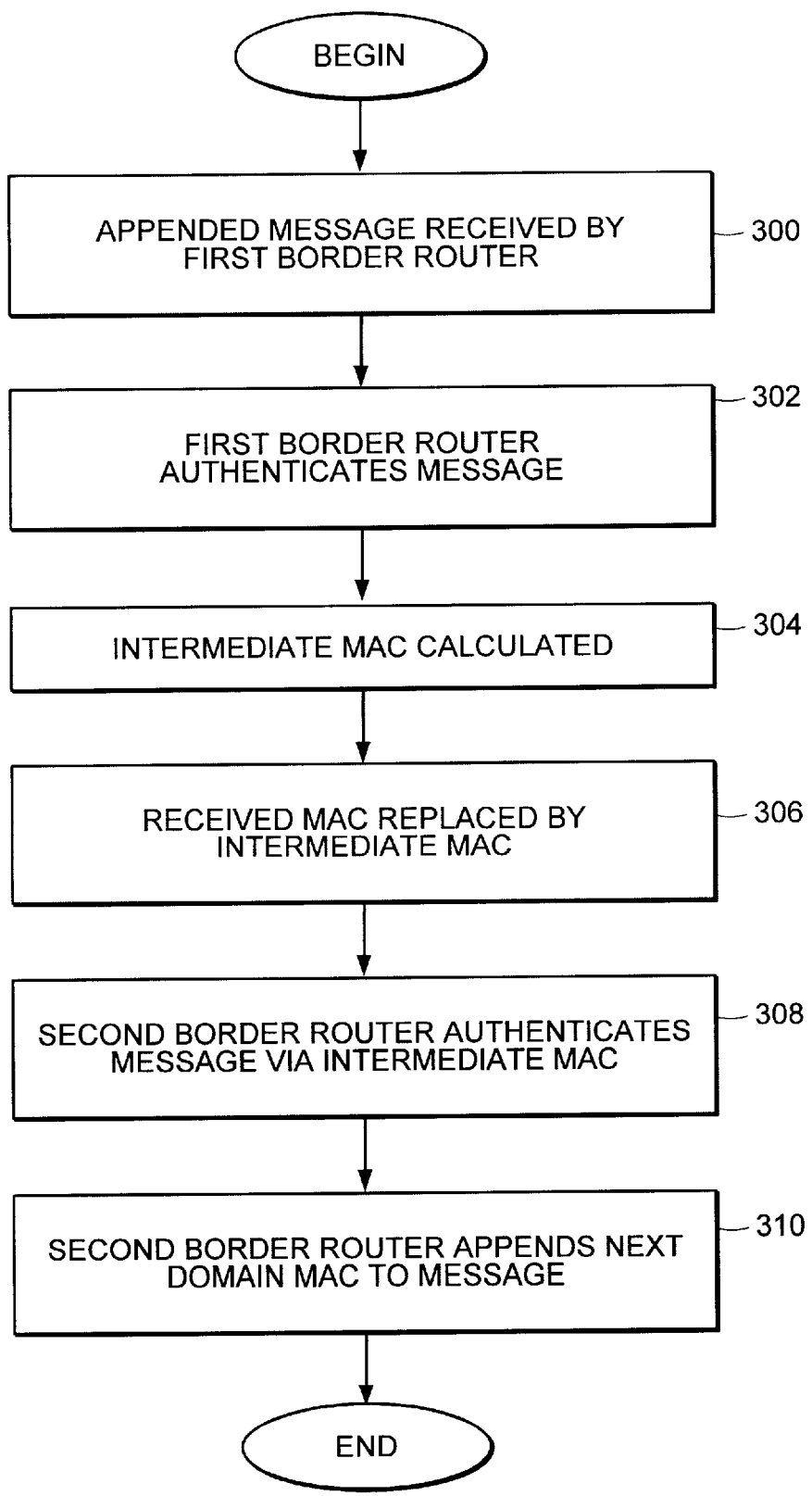
FIG. 3A shows a preferred process of translating the message authentication code from that used by the first multicast domain to that used by the second multicast domain.

FIG. 3A shows details of the message translation process noted above in step 204. The process begins at step 300 in which the appended message (i.e., the original message as transmitted from a sending router) is received by the first border router 20. As noted above, the message includes message data and an appended first domain MAC. The first border router 20 then authenticates the message (step 302). As noted above, this authentication process can be executed by determining the first domain MAC, and comparing such determined MAC to the MAC appended to the message.

The process then continues to step 304 in which an intermediate MAC is calculated by the first border router 20. More particularly, both border routers 20 and 22 preferably are preconfigured to have a corresponding symmetrical intermediate key that is utilized to produce the intermediate MAC. In preferred embodiments, only the border routers 20 and 22 have access to the intermediate key. Although disclosed as being a symmetrical key, the intermediate key also may be a public key pair that operates in accord with well known Rivest, Shamir, and Adleman public cryptography methods ("RSA cryptography").

Accordingly, the intermediate key is retrieved from memory of the first border router 20, and then utilized with the message as input into a specified keyed hash function to produce the intermediate MAC. Once produced, the first border router 20 removes the first domain MAC, and then appends the intermediate MAC to the message (step 306) to produce an intermediate message. In alternative embodiments, the first border router 20 does not remove the first domain MAC.

The message and its appended intermediate MAC then are transmitted to the second border router 22 (step 308). As noted above, this transmission may be executed in any manner known in the art, such as via an Internet connection, or one or more intervening multicast domains. If the message is transmitted through one or more multicast domains operating in accord with preferred embodiments, then each domain includes a border router that is configured to process the intermediate message as described herein.

Upon receipt, the second border router 22 authenticates the intermediate message by any known method. For example, the second border router 22 may re-calculate the MAC by utilizing the intermediate key and message as input into the same keyed hash function utilized by the first border router 20.

By authenticating the intermediate Message, the second border router 22 is confirming that the intermediate message originated from the first border router 20. Moreover, the second border router 22 also is confirming (via the first border router 20) that the message originated from the sending router in the first domain 10. The first border router 20 therefore is considered to be vouching for the authenticity of the message from the sending router. Accordingly, the first and second border routers 20 and 22 preferably are operated by an entity that is trusted by administrators of both the first and second domains 10 and 12.

After it authenticates the intermediate message, the second border calculates the second domain MAC via the second domain key, message, and its designated keyed hash function in accord with conventional methods, and then appends such second domain MAC to the message (step 310). In preferred embodiments, the intermediate MAC is removed from the message prior to appending the second domain MAC to the message to form a second domain message. Once the second domain message is formed, it may be transmitted to the appropriate routers in the second domain 12. It should be noted that multiple versions of the processes shown in FIG. 2 each may execute simultaneously for messages transmitted both to and from the two domains.

In some embodiments, one border router may be utilized for both domains. Accordingly, in such case, the single border router may be preloaded with the appropriate MAC for both domains so that it can append the appropriate MAC to incoming messages after they are authenticated.

Figure 3B:
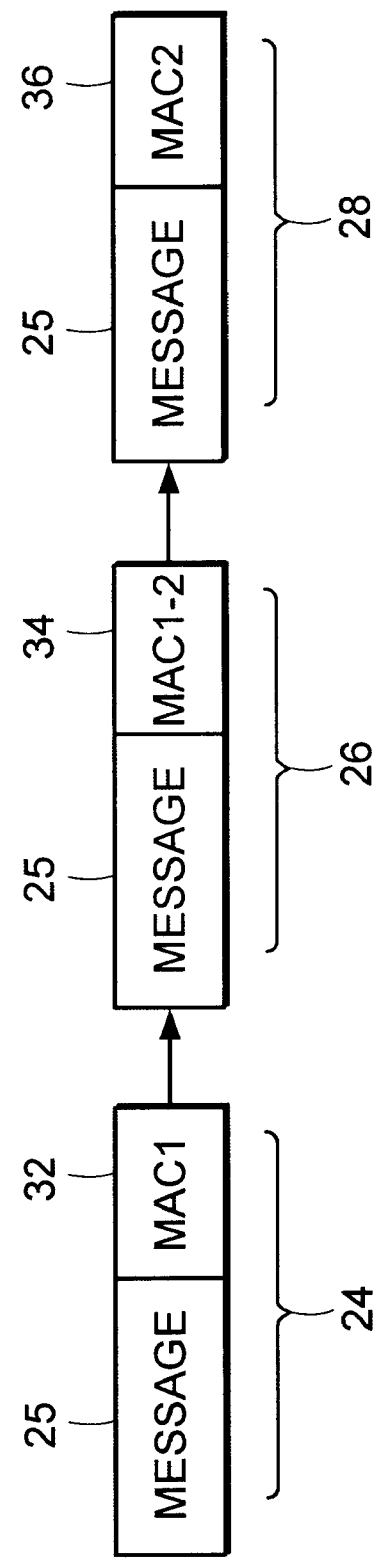
FIG. 3B shows the transformation of the message as it is transmitted from a sending network device to the receiving network device in accord with the processes shown in FIGS. 2 and 3A.

FIG. 3B shows the transformation of the message as it is transmitted from the sending router to the receiving router(s) in accord with the processes described above for FIGS. 2 and 3A. Specifically, FIG. 3B shows an original message 24 as transmitted from the sending router, an intermediate message 26 as transmitted from the first border router 20 to the second border router 22, and a final message 28 as transmitted from the second border router 22 to the receiving router. As shown, the original message 24 has message data 25 and an accompanying first domain MAC 32. The first border router 20 removes the first domain MAC 32 and appends the intermediate MAC 34 to the original message 24 to form the intermediate message 26. The second border router 22 consequently removes the intermediate MAC 34 and adds the second domain MAC 36 to produce the final message 28.

As known in the art, if the secrecy of the domain key of either domain is compromised, unauthorized network devices undesirably may interfere with multicast transmissions. For example, such unauthorized network devices may intercept multicast messages, participate in the multicast, or even prematurely end a multicast. Accordingly, preferred embodiments utilize an additional authentication method to confirm that messages transmitted between domains are authentic. Such method utilizes well known RSA public key pairs that are associated with each router 18 and border router 20 or 22 in both domains. In alternative embodiments, such method may utilize semi-public key pairs as described in co-pending U.S. patent application Ser. No. 09/247,263 entitled, "APPARATUS AND METHOD FOR DISTRIBUTING AUTHENTICATION KEYS TO NETWORK DEVICES IN A MULTICAST", naming Thomas Hardjono as inventor, filed Feb. 10, 1999, the disclosure of which is incorporated herein, in its entirety, by reference.

Figure 4A:
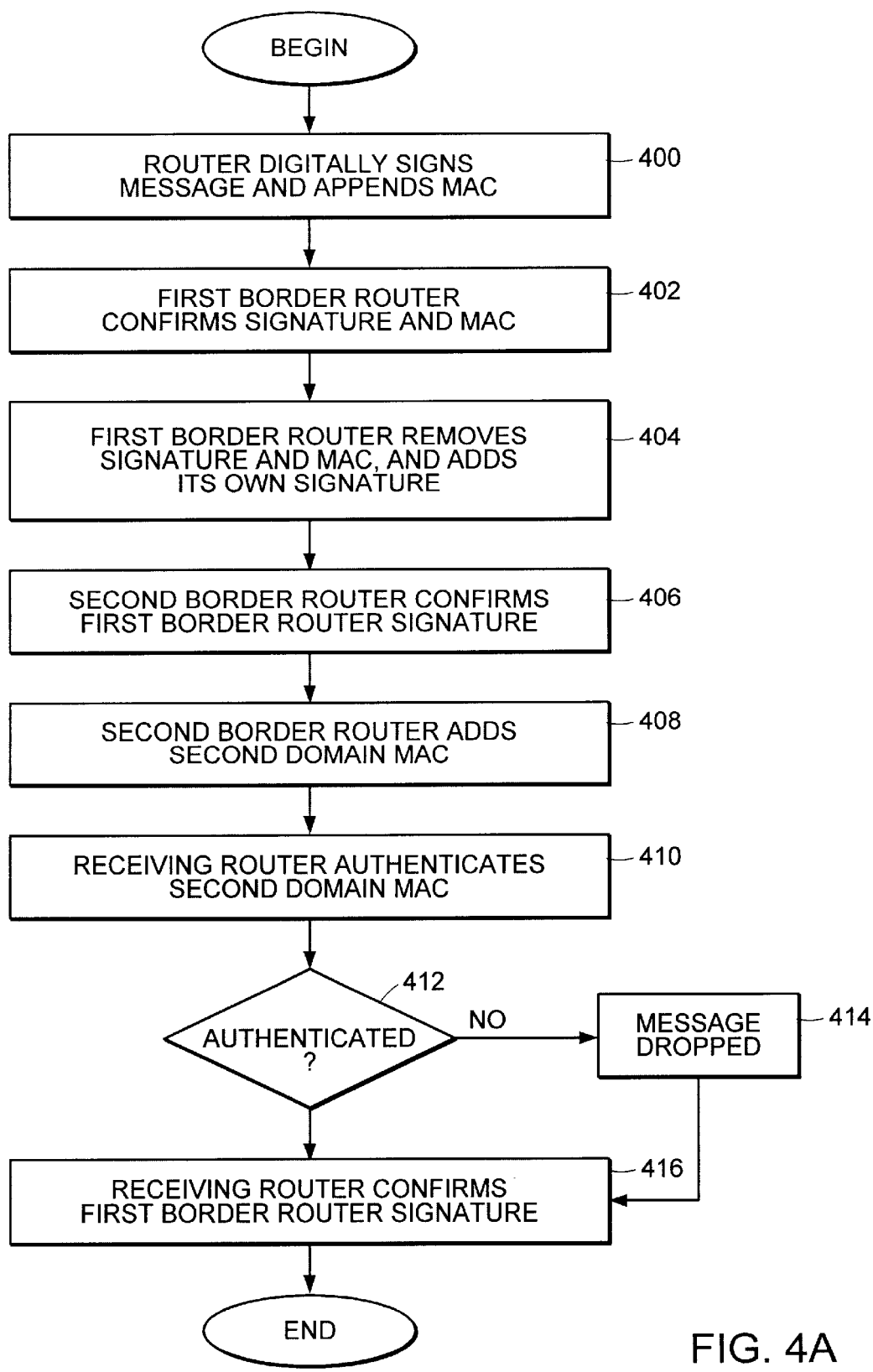
FIG. 4A shows an alternative method of authenticating messages transmitted between the first multicast domain and the second multicast domain.

In particular, FIG. 4A shows an alternative method of authenticating messages transmitted between the first domain 10 and the second domain 12. The method begins at step 400 in which a sending router (in the first domain 10) with a message utilizes the private key of its public key pair to digitally sign the message in accord with well known methods. The digital signature preferably is added to the message as part of the message data 25 (i.e., payload) associated with the message. In addition, the first domain key is utilized as discussed above to generate a first domain MAC 32. The generated first domain MAC 32 then is appended to the digitally signed message, and forwarded to the first border router 20. In a manner similar to that noted above, each intervening PIM router 18 in the first domain 10 between the sending router and the first border router 20 authenticates the signed message via the first domain MAC. None of the intervening routers, however, checks the digital signature.

The process then continues to step 402 in which the first border router 20 authenticates both the digital signature of the sending router, and the first domain MAC. If not authenticated, the message is dropped. If authenticated, then the first border router 20 removes both the digital signature of the sending router and the first domain MAC (step 404). In a manner similar to that performed by the sending router, the first border router 20 then adds its own digital signature as payload to the message, and transmits the resulting message to the second border router 22. In effect, by adding its digital signature to the message, the first border router 20 is vouching for the authenticity of the message as originating from sending router. Although not necessary, an intermediate MAC between the border routers may be appended (see FIGS. 2 and 3A).

The process then continues to step 406 in which the second border router 22 confirms (i.e., authenticates) the first border router signature in the received message. To that end, the second border router 22 retrieves the public key of the first border router 20. This key may be retrieved by many known means, such as from a certification authority, or through a well known Multicast Source Discovery Protocol connection ("MSDP connection") between the rendezvous routers 14 in each domain.

Once authenticated, the second border router 22 ascertains the second domain MAC 36 (e.g., via the second domain key, message, and keyed hash function), and appends it to the signed message (step 408) to form a final message 28. The final message 28 then is transmitted to the receiving router via any intervening routers or other second domain network devices. In accord with conventional PIM methods and as described above, each such intervening PIM router merely authenticates the message by examining the appended second domain MAC. The digital signature of the first border router 20 thus preferably is not examined by any such network devices. Once received, the receiving router preliminarily authenticates the final message 28 by accessing the appended second domain MAC (steps 410 and 412).

At step 412, if the final message 28 is determined to be preliminarily authenticated, then the receiving router confirms the first border router's digital signature in a manner described above. Conversely, if the final message 28 is not authenticated at step 412, then the process continues to step 414, in which the message is dropped and thus, not delivered to a receiving computer system in the receiving router's local network. Moreover, if determined to be not authentic, then the digital signature of the first border router 20 may be utilized to confirm that the message was authentic at least until transmitted from the first border router 20. Use of the first border router signature in this manner therefore aids debugging processes that may be utilized if messages are dropped.

Figure 4B:
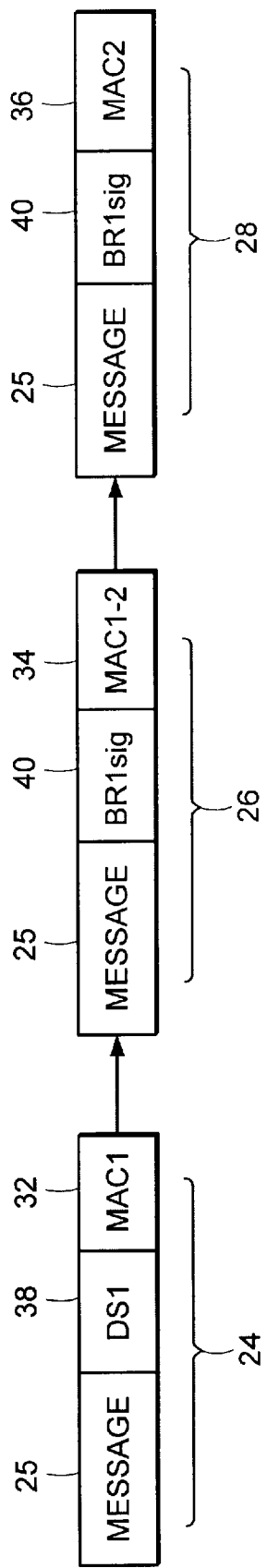
FIG. 4B shows the transformation of a message as it is processed by the method shown in FIG. 4A.

FIG. 4B shows the transformation of a message as it is processed by the method shown in FIG. 4A. Specifically, the original message 24 includes message data 25 and the digital signature 38 of the sending router as a payload, and the first domain MAC 32. When utilizing an intermediate key for the border routers 20 and 22, the first border router 20 removes the first domain MAC 32 and adds an intermediate MAC 34. In addition, the first border router 20 removes the sending router digital signature 38, and adds its own digital signature 40. Finally, FIG. 4B also shows the final message 28 with the second domain MAC 36 and the first border router digital signature 40.

Figure 5:
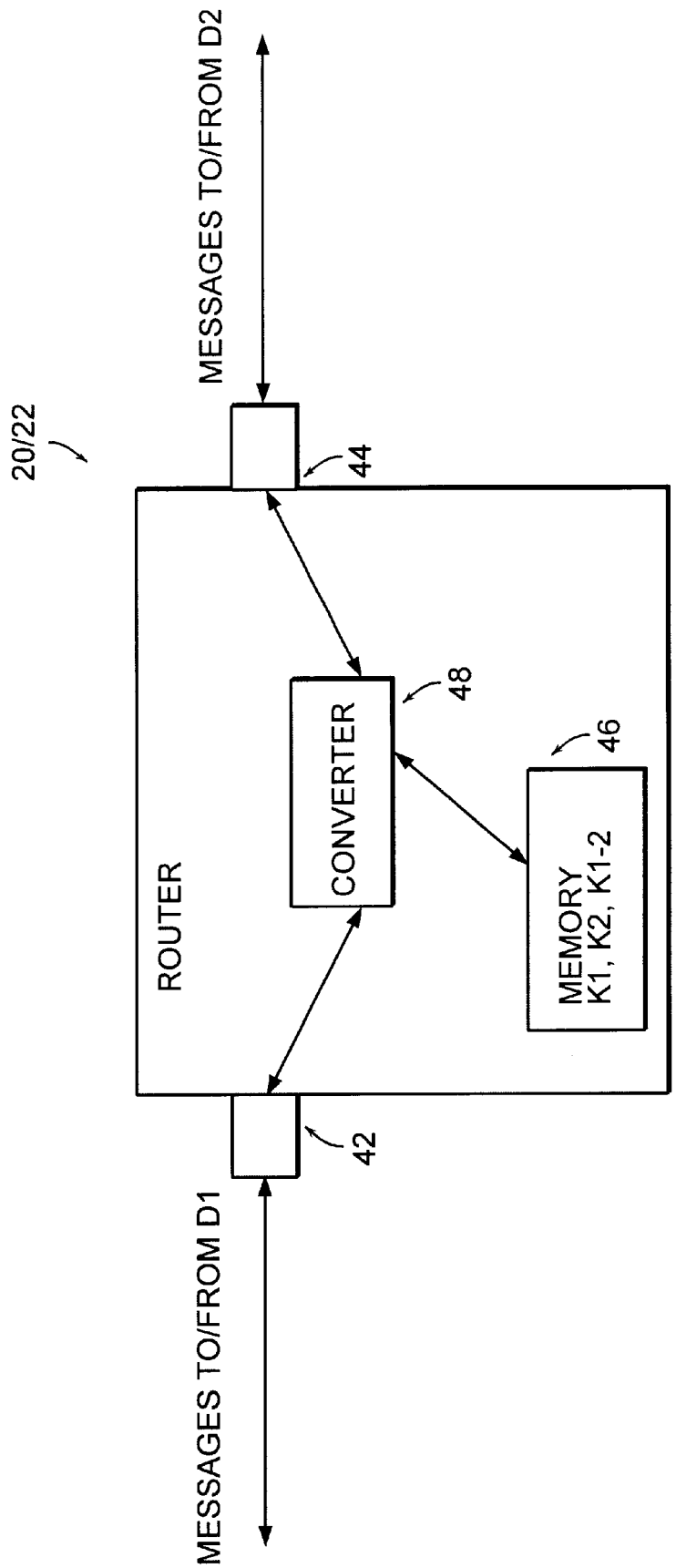
FIG. 5 schematically shows a border router configured in accord with preferred embodiments of the invention.

The border routers 20 and 22 may be any conventional router configured in accord with preferred embodiments of the invention. For example, the border routers 20 and 22 may be any one of the BAYSTACK ACCESS NODE™ family of routers, available from Bay Networks, Inc. of Santa Clara, Calif. FIG. 5 schematically shows a border router configured in accord with preferred embodiments of the invention. Specifically, the router includes a first interface 42 for receiving and sending messages from and to the first domain 10, a second interface 44 for receiving and sending message from and to the second domain 12, memory 46 for storing data (e.g., intermediate keys or domain keys), and a converter 48 with logic that converts messages as described above. For example, the converter 48 may remove MACs from messages received from the first domain 10, and add a MAC from the second domain 12. In addition, the converter 48 may include logic that authenticates messages received from either domain 10 or 12, such as from other border routers.

It should be noted that the order of various steps of the processes shown in the figures may be varied as necessary without affecting the execution of the process. It also should be noted that the network devices utilized in the multicast network 100 may be any conventionally known network device (e.g., a switch, server, etc . . . ) and thus, are not intended to be limited to routers. Routers are discussed for exemplary purposes only and should not be construed to limit the use or scope of preferred embodiments of the invention.

Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

We claim:

1. A border network device that transmits messages between a first multicast domain and a second multicast domain, the first multicast domain having one or more first network devices, the second multicast domain having one or more second network devices, the border network device comprising:

a first interface that receives a first domain message from the first domain for delivery to the second domain, the first domain message having first domain origin data, messages with first domain origin data originating from at least one of the first network devices;

a first message converter that converts the received first domain message into a first intermediate message, the first intermediate message including intermediate data indicating that the intermediate message originated from the border network device; and an output that forwards the first intermediate message to a receiving second network device in the second domain;

wherein the first intermediate message includes data that causes the receiving second network device to convert the first intermediate message into a second message, the second message including data indicating that the second message originated from one of the second network devices.

2. The border network device as defined by claim 1 further comprising:

an intermediate interface that receives a second intermediate message from a given second network device, the second intermediate message having origination data indicating that it originated from the given second network device; and a second message converter that converts the received second intermediate message into a converted first domain message with first domain data.

3. The border network device as defined by claim 2 wherein the output forwards the converted first domain message to at least one of the first network devices.

4. The border network device as defined by claim 1 wherein the first multicast domain has an associated key for authenticating messages transmitted between first network devices, the first origin data being associated with the first key.

5. The border network device as defined by claim 1 wherein the first multicast domain requires that each message authorized to be forwarded to first network devices in a multicast includes first domain origin data.

6. The border network device as defined by claim 1 wherein the first network devices comprise the border network device.

7. The border network device as defined by claim 1 further comprising:
   memory for storing an intermediate key, the first message converter retrieving the intermediate key from the memory to convert the received first domain message into the first intermediate message.

8. The border network device as defined by claim 1 further comprising:
   an authenticator operatively coupled with the first message converter, the authenticator confirming that the first domain message includes first domain origin data.

9. The border network device as defined by claim 1 wherein the receiving second network device is a border network device that converts the first intermediate message into a second message, the second message including data indicating that the second message originated from the receiving second network device.

10. A method of transmitting messages between a first multicast domain and a second multicast domain, the first multicast domain having one or more first network devices, the second multicast domain having one or more second network devices, the method comprising:
    receiving a first domain message from the first domain for delivery to the second domain, the first domain message having first domain origin data, messages with first domain origin data originating from at least one of the first network devices;
    converting the received first domain message into a first intermediate message, the first intermediate message including intermediate data indicating that the intermediate message originated from a border network device; and
    forwarding the first intermediate message to a receiving second network device in the second domain;
    wherein the first intermediate message includes data that causes the receiving second network device to convert the first intermediate message into a second message, the second message including data indicating that the second message originated from one of the second network devices.

11. The method as defined by claim 10 further comprising:
    receiving a second intermediate message from a given second network device, the second intermediate message having origination data indicating that it originated from the given second network device; and
    converting the received second intermediate message into a converted first domain message with first domain data.

12. The method as defined by claim 11 further comprising forwarding the converted first domain message to at least one of the first network devices.

13. The method as defined by claim 10 wherein the first multicast domain has an associated key for authenticating messages transmitted between first network devices, the first origin data being associated with the first key.

14. The method as defined by claim 10 wherein the first multicast domain requires that each message authorized to be forwarded to first network devices in a multicast includes first domain origin data.

15. The method as defined by claim 10 wherein the first network devices comprise the border network device.

16. The method as defined by claim 10 wherein the act of converting comprises:
    retrieving the intermediate key from memory to convert the received first domain message into the first intermediate message.

17. The method as defined by claim 10 further comprising:
    confirming that the first domain message includes first domain origin data.

18. The method as defined by claim 10 wherein the receiving second network device is a second border network device that converts the first intermediate message into a second domain message having data indicating that the message originated from the receiving second network device.

19. A computer program product for use on a computer system for transmitting messages between a first multicast domain and a second multicast domain, the first multicast domain having one or more first network devices, the second multicast domain having one or more second network devices, the computer program product comprising a computer usable medium having computer readable program code thereon, the computer readable program code including:
    program code for receiving a first domain message from the first domain for delivery to the second domain, the first domain message having first domain origin data, messages with first domain origin data originating from at least one of the first network devices;
    program code for converting the received first domain message into a first intermediate message, the first intermediate message including intermediate data indicating that the intermediate message originated from a border network device; and
    program code for forwarding the first intermediate message to a receiving second network device in the second domain;
    wherein the first intermediate message includes data that causes the receiving second network device to convert the first intermediate message into a second message, the second message including data indicating that the second message originated from one of the second network devices.

20. The computer program product as defined by claim 19 further comprising:
    program code for receiving a second intermediate message from a given second network device, the second intermediate message having origination data indicating that it originated from the given second network device; and
    program code for converting the received second intermediate message into a converted first domain message with first domain data.

21. The computer program product as defined by claim 20 further comprising program code for forwarding the converted first domain message to at least one of the first network devices.

22. The computer program product as defined by claim 19 wherein the first multicast domain has an associated key for authenticating messages transmitted between first network devices, the first origin data being associated with the first key.

23. The computer program product as defined by claim 19 wherein the first multicast domain requires that each message authorized to be forwarded to first network devices in a multicast includes first domain origin data.

24. The computer program product as defined by claim 19 wherein the first network devices comprise the border network device.

25. The computer program product as defined by claim 19 wherein the program code for converting comprises:
   program code for retrieving the intermediate key from memory to convert the received first domain message into the first intermediate message.

26. The computer program product as defined by claim 19 further comprising:
   program code for confirming that the first domain message includes first domain origin data.

27. The computer program product as defined by claim 19 wherein the receiving second network device is a second border network device that converts the first intermediate message into a second domain message having data indicating that the message originated from the receiving second network device.

28. A border network device that transmits messages between a first multicast domain and a second multicast domain, the first multicast domain having one or more first network devices, the second multicast domain having one or more second network devices, the border network device comprising:
   an intermediate interface that receives a second intermediate message from the second domain, the second intermediate message including intermediate data indicating that the second intermediate message originated from one network devices, the second intermediate message being converted by the one of the second network devices from a second domain message including second domain data indicating that the second domain message originated from at least one of the second network devices;
   a first message converter that converts the received second intermediate message into a converted first domain message with first domain data, message with first domain data originating from one of the first network devices; and
   a first output that forwards the converted first domain message to at least one of the first network devices.

29. A border network device as defined by claim 28 further comprising:
   a first interface that receives a first domain message from at least one of the first network devices, the first domain message having first domain data;
   a second message converter that converts the received first domain message into a first intermediate message, the first intermediate message having data indicating that the first intermediate message originated from the border router; and
   a second output that forwards the first intermediate message to at least one of the second network devices.

30. The border network device as defined by claim 28 wherein the first multicast domain has an associated first key for authenticating messages transmitted between first network devices, the first domain data being associated with the first key.

31. The border network device as defined by claim 28 wherein the first multicast domain requires that each first domain message authorized to participate in a multicast in the first domain include first domain origin data.

32. The border network device as defined by claim 28 wherein the at least one of the first network devices receiving the converted first domain message converts the converted first domain message into a second domain message having data indicating that the message originated from one of the second network devices.

33. The border network device as defined by claim 28 further comprising:
   an authenticator operatively coupled with the first message converter, the authenticator checking the second intermediate message to determine if the second intermediate message includes the intermediate data.

34. A method of transmitting messages between a fist multicast domain and a second multicast domain, the first multicast domain having one or more first network devices, the second multicast domain having one or more second network devices, the border network device comprising:
   receiving a second intermediate message from the second domain, the second intermediate message including intermediate data indicating that the second intermediate message originated from one of the second network devices, the second intermediate message being converted by the one of the second network devices from a second domain message including second domain data indicating that the second domain message originated from at least one of the second network devices;
   converting the received second intermediate message into a converted first domain message with first domain data, messages with first domain data originating from one of the first network devices; and
   forwarding the converted first domain message to at least one of the first network devices.

35. The method as defined by claim 34 further comprising:
   receiving a first domain message from at least one of the first network devices, the first domain message having first domain data;
   controlling a border network device to convert the received first domain message into a first intermediate message, the first intermediate message having data indicating that the first intermediate message originated from the border router; and
   forwarding the first intermediate message to at least one of the second network devices.

36. The method as defined by claim 34 wherein the first multicast domain has an associated first key for authenticating messages transmitted between first network devices, the first domain data being associated with the first key.

37. The method as defined by claim 34 wherein the first multicast domain requires that each first domain message authorized to participate in a multicast in the first domain include first domain origin data.

38. The method as defined by claim 34 wherein the at least one of the first network devices receiving the converted first domain message converts the converted first domain message into a second domain message having data indicating that the message originated from one of the second network devices.

39. The method as defined by claim 34 further comprising:
   checking the intermediate message to determine if the second intermediate message includes the second intermediate data.

40. A computer program product for use on a computer system for transmitting messages between a first multicast domain and a second multicast domain, the first multicast domain having one or more first network devices, the second multicast domain having one or more second network devices, the computer program product comprising a computer usable medium having computer readable program code thereon, the computer readable program code including:

program code for receiving a second intermediate message from the second domain, the second intermediate message including intermediate data indicating that the second intermediate message originated from one of the second network devices, the second intermediate message being converted by the one of the second network devices from a second domain message including second domain data indicating that the second domain message originated from at least one of the second network devices;

program code for converting the received second intermediate message into a converted first domain message with first domain data, messages with first domain data originating from one of the first network devices; and program code for forwarding the converted first domain message to at least one of the first network devices.

41. The computer program product as defined by claim 40 further comprising:

program code for receiving a first domain message from at least one of the first network devices, the first domain message having first domain data;

program code for controlling a border network device to convert the received first domain message into a first intermediate message, the first intermediate message having data indicating that the first intermediate message originated from the border router; and program code for forwarding the first intermediate message to at least one of the second network devices.

42. The computer program product as defined by claim 40 wherein the first multicast domain has an associated first key for authenticating messages transmitted between first network devices, the first domain data being associated with the first key.

43. The computer program product as defined by claim 40 wherein the first multicast domain requires that each first domain message authorized to participate in a multicast in the first domain include first domain origin data.

44. The computer program product as defined by claim 40 wherein the at least one of the first network devices receiving the converted first domain message converts the converted first domain message into a second domain message having data indicating that the message originated from one of the second network devices.

45. The computer program product as defined by claim 40 further comprising:

program code for checking the second intermediate message to determine if the intermediate message includes the second intermediate data.

46. A method of transmitting messages between a first multicast domain and a second multicast domain, the method comprising:

receiving a first message from a first network device in the first domain, the first message having first identification data indicating that the first message originated from the first network device, the first message also having first domain origin data indicating that the first message originated in the first multicast domain;

controlling a confirming network device to analyze the first identification data to determine that the first message originated from the first network device;

adding second identification data to the first message to form an authenticated message, the second identification data indicating that the first message was authenticated by the confirming network device; and forwarding the authenticated message to a second network device in the second domain, the second network device adding third identification data to the first message, the third identification data indicating that the first message originated from the second network device, the second network device also adding second domain origin data to the first message, the second domain origin data indicating that the first message originated in the second multicast domain.

47. The method as defined by claim 46 wherein the first identification data includes a digital signature of the first network device.

48. The method as defined by claim 46 wherein the second identification data includes a digital signature of the confirming network device.

49. The method as defined by claim 46 further comprising:

removing the first identification data.

50. The method as defined by claim 46 wherein the first domain requires that each first domain message authorized to participate in a multicast include first domain origin data, each message with first domain origin data originating from a device in the first domain.

51. The method as defined by claim 50 wherein the act of adding comprises:

adding intermediate data to form the authenticated message, the intermediate data indicating that the first message was authenticated by the confirming network device.

52. The method as defined by claim 51 wherein the intermediate data is formed by a key that is associated with both the confirming network device and the second network device.

53. The method as defined by claim 50 wherein the first domain origin data includes a MAC.

54. The method as defined by claim 46 wherein the confirming network device is in the first domain.

\* \* \* \* \*

UNITED STATES PATENT AND TRADEMARK OFFICE
CERTIFICATE OF CORRECTION

PATENT NO. : 6,725,276 B1
DATED : April 20, 2004
INVENTOR(S) : Hardjono et al.

It is certified that error appears in the above-identified patent and that said Letters Patent is hereby corrected as shown below:

Column 13,
Line 36, after "from one" insert -- of the second --.
Line 44, delete "message" and insert -- messages --.

Signed and Sealed this

Eighteenth Day of October, 2005

JON W. DUDAS
*Director of the United States Patent and Trademark Office*